No. 696,342.  
H. C. KARPENSTEIN.  
COMBINED FACE STEAMER AND INHALER.  
(Application filed Mar. 28, 1901.)  
Patented Mar. 25, 1902.
(No Model.)
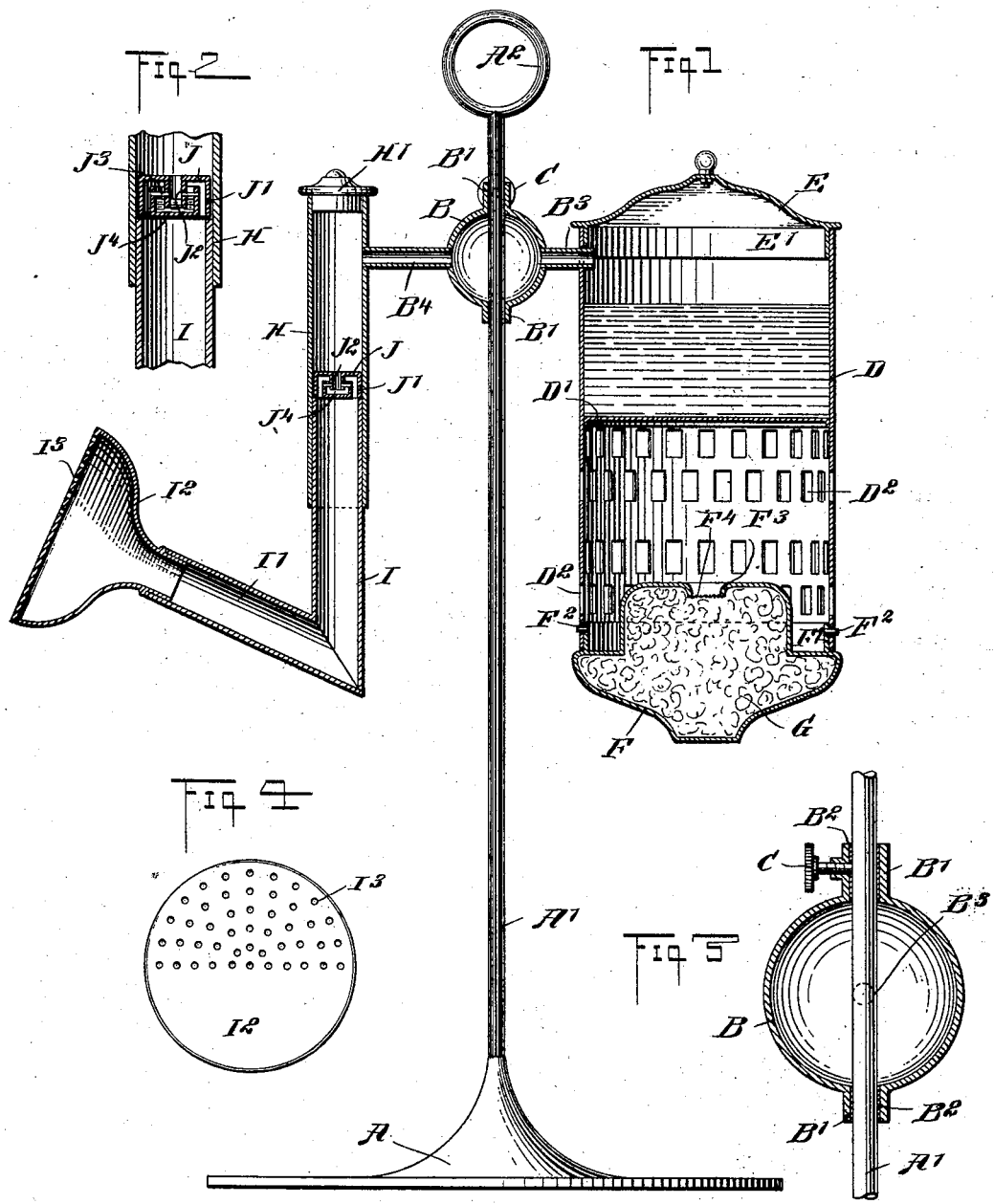
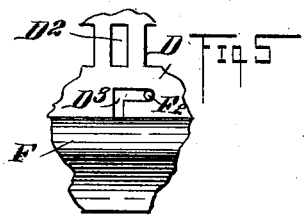
WITNESSES:
INVENTOR  
Henry C. Karpenstein  
BY  
ATTORNEYS

UNITED STATES PATENT OFFICE.

HENRY CHAS. KARPENSTEIN, OF BROOKLYN, NEW YORK.

COMBINED FACE-STEAMER AND INHALER.

SPECIFICATION forming part of Letters Patent No. 696,342, dated March 25, 1902.

Application filed March 28, 1901. Serial No. 53,199. (No model.)

*To all whom it may concern:*

Be it known that I, HENRY CHARLES KARPENSTEIN, a citizen of the United States, and a resident of the city of New York, borough of Brooklyn, in the county of Kings and State of New York, have invented Improvements in a Combined Face-Steamer and Inhaler, of which the following is a full, clear, and exact description.

My invention relates to apparatus for producing a spray of heated vapor, and has for its object to provide a simple apparatus of the above-indicated class which will enable the patient or physician to readily vary the nature of the vapors and to direct them as desired.

The invention will be fully described hereinafter and the features of novelty pointed out in the appended claims.

Reference is to be had to the accompanying drawings, forming a part of this specification, in which similar characters of reference indicate corresponding parts in all the figures.

Figure 1 is a sectional elevation of my improved apparatus. Fig. 2 is a detail drawn upon an enlarged scale, showing the arrangement of the medicating pan or cup. Fig. 3 is a cross-section of the adjusting device. Fig. 4 is a face view of the spray-head, and Fig. 5 is a detail side elevation showing the manner of attaching the burner to the shell.

The apparatus comprises a base A, from which rises a standard A', having at its upper end a ring $A^2$, by means of which the entire apparatus may be readily carried from place to place. Upon this standard is mounted to slide vertically a hollow spherical body B, having sleeves B' with linings $B^2$ to produce a tight joint. Through one of the sleeves B' projects a set-screw C, arranged to engage the standard A' to lock the body B in position. From the said body extend in opposite directions tubes $B^3 B^4$, respectively. Of these the tube $B^3$ supports a shell D, into which it projects slightly, and said shell has a cover or lid E with a flange E', notched to take over the tube $B^3$. The upper portion of the shell is imperforate and, with a bottom D', forms a receptacle for water or a solution of a medicament or other substance. The lower portion of the shell has perforations $D^2$ for supplying air to a burner F, secured at the bottom of the shell. Preferably the burner has a flange F' with projections $F^2$, adapted to fit into bayonet-slots $D^3$ at the bottom of the shell D. The burner has a central depressed portion $F^3$ with a wire-netting $F^4$, and the burner-body is filled with cotton-batting G or equivalent absorbent material.

The tube $B^4$ supports an upright tube H, adapted to be closed by a lid H' and arranged to receive the vertically-adjustable tube I, sliding with sufficient friction to keep it stationary in whatever position it may be left. The lower end of the tube I has an upwardly-inclined member I', terminating in a spray-head $I^2$. The latter has perforations $I^3$ in its upper portion only, while its lower portion is imperforate. On the upper edge of the tube I is adapted to rest a flange J', projecting downwardly from a plate J, provided with a central depending tube $J^2$. With this tube $J^2$ is connected, by means of pins $J^3$, a cup $J^4$, having its upper edge above the lower edge of the central tube.

In operation the receptacle at the upper part of the shell D is filled with water or a suitable solution, and the burner F is lighted. The vapor or steam passes through the tube $B^3$ into the hollow body B and then through the tube $B^4$ into the tubes H and I, passing out finally through the perforations $I^3$ of the spray-head $I^2$. A double adjustment is afforded in a vertical direction, as the spray-head may be raised and lowered by sliding the tube I in the tube H, or the entire apparatus may be adjusted by sliding it on the standard A'. The tube I and spray-head $I^2$ may of course also be turned sidewise about a vertical axis. The purpose of making the lower portion of the spray-head $I^2$ imperforate is to prevent any condensation product from dripping down at the outlet. Any water or other condensation product will run down the inclined member I' and collect at the bottom thereof. From time to time the tube I will be removed and the accumulated liquid poured out therefrom. When the cup $J^4$ is empty, nothing but steam or the vapor of the solution contained in the upper part of the shell D will be delivered through the perforations $I^3$. In such a case it will be preferable to remove the cup $J^4$, with its supporting-plate J, which can be done readily upon lifting the cover H' and the tube I. When the cup J⁴ is filled with a medicament, a perfume, or other substance in solution, the vapor is compelled to pass through the solution, since the central tube J² dips into it, and thus there will be discharged at the head I² steam or vapor laden with perfume, medicine, or other suitable substances.

The apparatus may be used as a face-steamer for cosmetic purposes or as an inhaler for various medicaments; but I do not wish to restrict myself to any particular use of the apparatus.

Having thus described my invention, I claim as new and desire to secure by Letters Patent—

1. A vaporizing device, comprising means for generating a vapor, a spraying-head for distributing said vapor, a cup and a nipple both located in the path of the vapor, the said nipple extending into said cup, means for supporting said nipple, and a plurality of pins for securing said cup to said nipple so that said cup depends from said nipple and said vapor can pass between said nipple and said cup.

2. A vaporizing device, comprising a vapor-generator, a spraying-head, a series of tubes connecting said vapor-generator and said spraying-head, two of said tubes forming an adjustable telescopic connection with each other, a plate located in one of said tubes and provided with a flange engaging the end of the other tube at the said telescopic connection and also provided with a nipple depending from said plate, a cup concentric with said nipple, and pins for securing said cup to said nipple so as to depend therefrom and allow the vapor to pass between said nipple and said cup.

3. A vaporizing device, comprising a support or receptacle, a lamp for heating said receptacle, vents between said lamp and said receptacle for the escape of gases, a spraying-head, a series of tubes connecting said receptacle and said spraying-head, a nipple located in the path of the vapor in one of said tubes, a cup also located in said tube adjacent to said nipple, and fasteners for securing said cup and for spacing the same concentric to said nipple so that vapor can pass centrally into the cup and thence pass outside of the nipple to the spraying-head.

4. A vaporizing device, comprising a support, an upright tube carried thereby, a vertically-adjustable tube sliding within said upright tube and provided with a spray-head, an apertured support resting on the upper edge of said adjustable tube, a cup carried by said support, a receptacle communicating with said tubes, and means for heating the receptacle.

5. A vaporizing device, comprising a support, a receptacle carried thereby, a heater for said receptacle, a steam or vapor tube communicating with the receptacle and provided with a discharge-head, an apertured plate located within said tube and having a central nipple, and a cup which is carried by said plate and into which dips the lower end of said nipple.

6. A vaporizing device, comprising a tube provided with a discharge-head, an apertured plate located within the said tube, and provided with a central nipple, and a cup which is carried by said plate and into which dips the lower end of said nipple.

7. A vaporizing device, comprising an upright guide-tube, a vertically-adjustable tube, the upper portion of which slides within said upright tube and the lower portion of which is provided with a spray-head, an apertured support resting on the upper edge of said adjustable tube, and a cup carried by said support.

In testimony whereof I have signed my name to this specification in the presence of two subscribing witnesses.

HENRY CHAS. KARPENSTEIN.

Witnesses:
JOHN LOTKA,
EVERARD BOLTON MARSHALL.